Aug. 29, 1933.   J. A. JOSEPHSEN   1,924,941
POWER TRANSMITTING APPARATUS
Filed Nov. 8, 1932   3 Sheets-Sheet 1
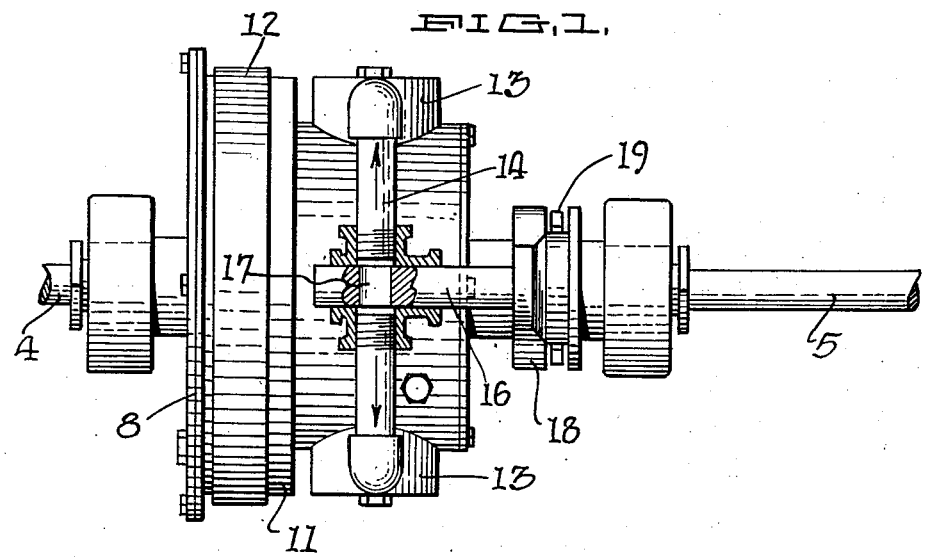
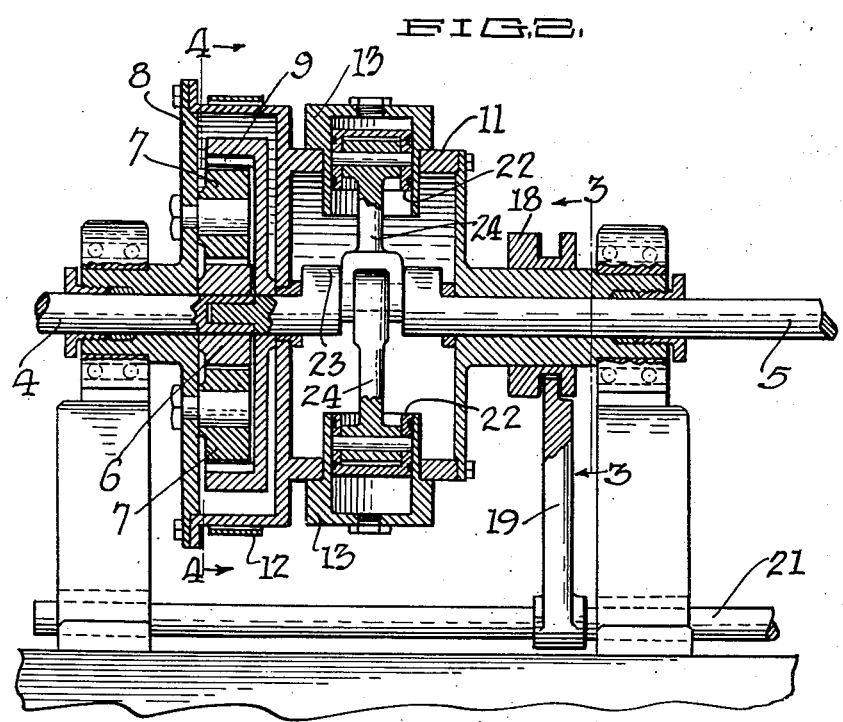
Inventor
JOSEPH A. JOSEPHSEN
By *Victor J. Evans & Co*
Attorneys.

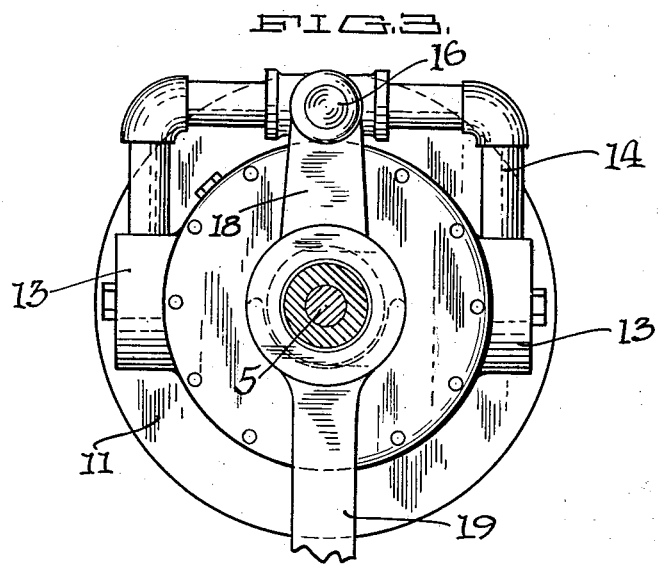
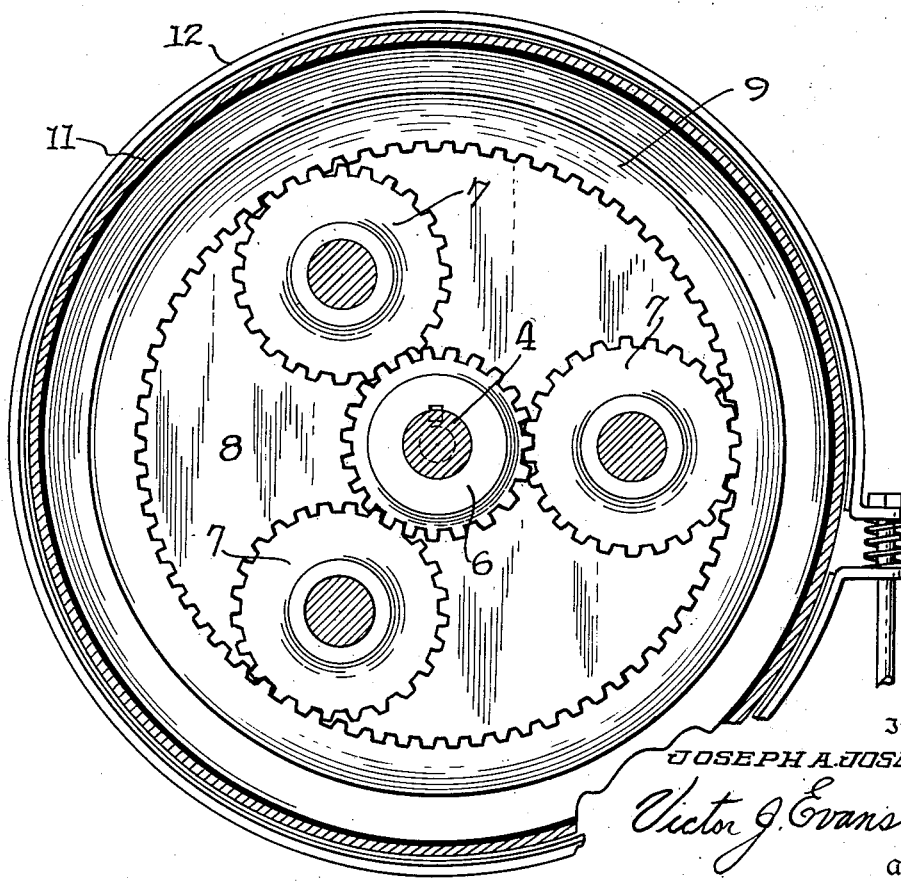

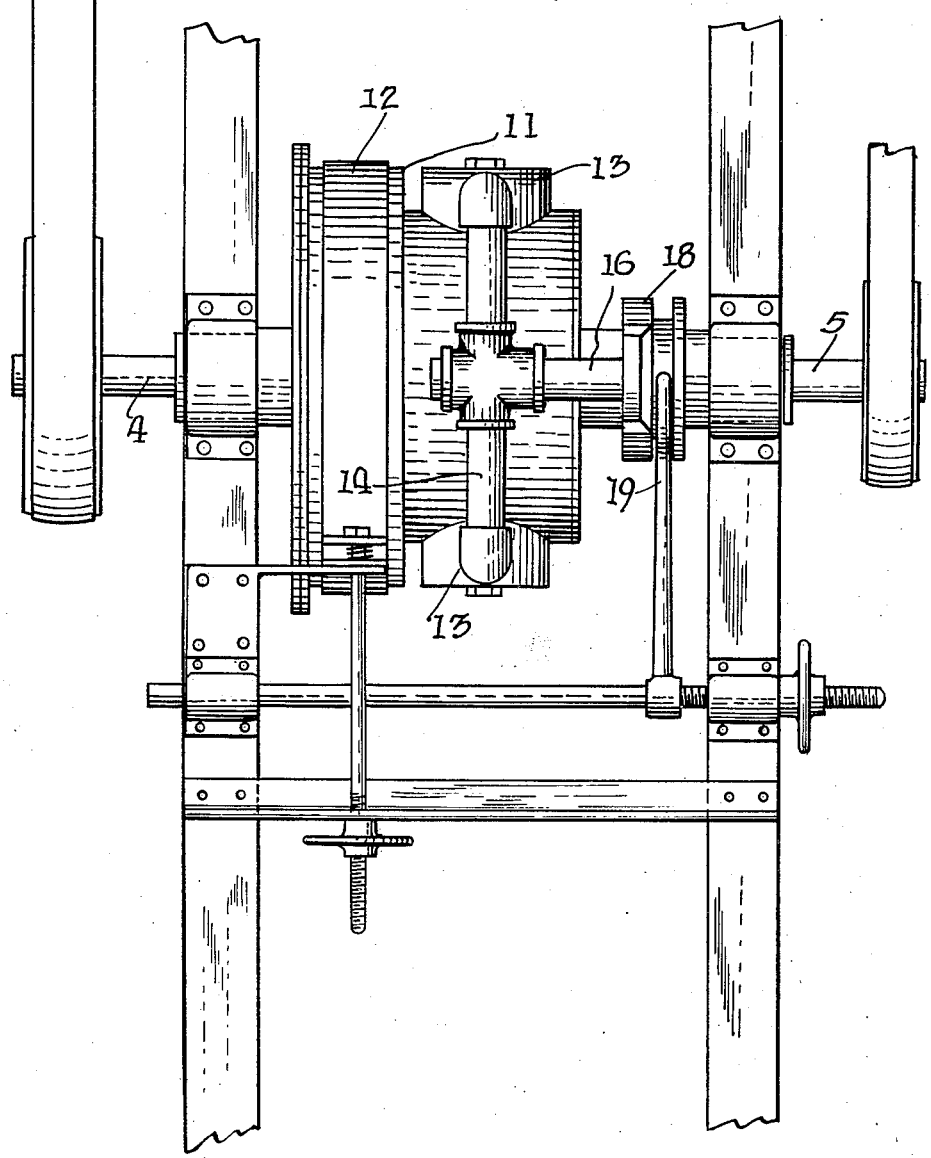

Patented Aug. 29, 1933

1,924,941

UNITED STATES PATENT OFFICE 1,924,941

POWER TRANSMITTING APPARATUS

Joseph A. Josephsen, Arcadia, Calif.

Application November 8, 1932. Serial No. 641,783

1 Claim. (Cl. 74—34)

This invention relates to improvements in power transmitting apparatus and has particular reference to a variable speed transmission.

The principal object of this invention is to produce a means for driving any mechanism from a power unit through which device the load may be picked up, varied or reversed at the will of the operator.

A further object is to produce a device which is simple in construction and therefore economical to manufacture.

A still further object is to produce a device wherein all connecting parts are in constant mesh.

Other objects and advantages will be apparent during the course of the following description.

In the accompanying drawings forming a part of this specification and in which like numerals are employed to designate like parts throughout the same, Fig. 1 is a side elevation of my device having a portion thereof broken away, Fig. 2 is a vertical cross section of my device, Fig. 3 is an end elevation of Fig. 1, Fig. 4 is an enlarged detail cross sectional view taken on the line 4—4 of Fig. 2, and Fig. 5 illustrates the application of my device to a power shaft.

In delivering power from the power unit to a machine or other apparatus to be driven, it is often essential that some means be provided for changing the speed ratio between the driving shaft and the driven shaft. This is sometimes accomplished by employing sliding gears of different ratio, which mesh with each other in succession, thus enabling different variation in speed relation. Applicant has provided a novel means for accomplishing this, without the employment of sliding gears.

In the accompanying drawings wherein for the purpose of illustration is shown a preferred embodiment of my invention, the numeral 4 designates a driving shaft and the numeral 5 a driven shaft. These shafts are supported in any suitable manner. The shaft 4 has secured thereto a gear 6 which meshes with gears 7 rotatably mounted upon a plate 8 freely rotatable upon the shaft 4. A ring gear 9 is secured to the end of the shaft 5 and meshes with the gears 7. A casing 11 is secured to the plate 8 and has bearing on the shaft 5. This casing 11 has a surface engaged by a back band 12, the purpose of which will be later seen. Cylinders 13 are also carried in this casing and are connected one to the other by a pipe 14 which pipe has slidably extending therethrough a valve 16 having a port 17 therein. This valve is connected to a collar 18 which is moved by a yoke 19 actuated by a slide rod 21. Within the cylinders 13 are pistons 22. The shaft 5 has a crank 23 to which connecting rods 24 extend in opposite directions and connect to the pistons 22.

The operation of my device is as follows:—

Assuming that the shaft 4 is rotating, the gear 6 will transmit motion to the gears 7 which will cause them to roll about the gear 9 thus carrying the plate 8 and the casing 11. Now assuming that the shaft 5 is stationary this rotation of the casing 11 will cause a pumping action in the cylinders and assuming that the valve 16 has been moved so that the port 17 is in the position of Fig. 1, the result will be that the fluid contained in the cylinders will be pumped back and forward from one cylinder to the other. In this condition no power will be transmitted to the shaft 5.

Assuming now that the yoke 19 is moved toward the left of Fig. 2 the port 17 will be moved out of alignment with the pipe 14 and as the flow is gradually cut off between the two cylinders resistance will be imparted to the pumping action to the pistons and as this resistance increases the tendency will be to rotate the shaft 5. As soon as the valve is entirely closed off the casing 11 will be virtually locked to the shaft 5 and as there is no relative movement between the casing 11 and the gear 9 it will be apparent that the idlers 7 will act as positive driving connections between the teeth of the gear 9 and the teeth of the gear 6. Therefore the shaft 5 this time will revolve at the same speed as the shaft 4. As the valve 16 is opened slightly there will be a partial movement of the pistons in their cylinders and this will permit a slippage or a change in speed between the shafts 4 and 5. When it is desired to reverse the movement between the shafts 4 and 5 the valve is moved to the position of Fig. 1 and then the band 12 is tightened so as to hold the casing 11 against rotation with the result that the gear 6 will rotate the gear 9 through the gears 7 but in a reverse direction. The form shown in Fig. 5 is identical with that shown in Figs. 1 and 2 with the exception that the same is mounted so as to drive overhead shafting.

It is to be understood that the forms of my invention herewith shown and described are to be taken as preferred example of the same and that various changes relative to the material, size, shape and arrangement of parts may be resorted to without departing from the spirit of the invention or the scope of the subjoined claim.

Having thus described my invention, I claim:—

In a device of the character described, a driving shaft, a driven shaft, a plate rotatably positioned on said driving shaft, a gear secured to said driving shaft, a plurality of gears rotatably supported on said plate and meshing with said gear on said driving shaft, a ring gear secured to said driven shaft, a housing secured to said plate and rotatably supported on said driven shaft, a crank formed in said driven shaft, pistons connected to said crank and reciprocally movable in cylinders carried in said housing, fluid carrying pipes connecting said cylinders, a valve controlling the flow of fluid through said pipes, a brake band surrounding said housing and capable of preventing rotation of said housing with respect to said shafts.

JOSEPH A. JOSEPHSEN.